(12) United States Patent
Yamada et al.

(10) Patent No.: US 8,228,517 B2
(45) Date of Patent: Jul. 24, 2012

(54) IMAGE PROCESSING APPARATUS AND IMAGE PROCESSING METHOD BASED ON READING CONTROL INFORMATION AS AN IMAGE

(75) Inventors: Nobuyasu Yamada, Yamatokoriyama (JP); Yuji Okamoto, Kyoto (JP); Shuhji Fujii, Kizugawa (JP); Kaoru Ishikura, Kyoto (JP); Nobuyuki Ueda, Nara (JP); Atsushi Ogo, Kizugawa (JP); Kenji Takahashi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 904 days.

(21) Appl. No.: 12/325,768

(22) Filed: Dec. 1, 2008

(65) Prior Publication Data
US 2009/0141300 A1    Jun. 4, 2009

(30) Foreign Application Priority Data
Dec. 3, 2007    (JP) .................................. 2007-312313

(51) Int. Cl.
*G06F 3/12* (2006.01)
(52) U.S. Cl. ...................... 358/1.13; 358/1.14; 358/1.15; 358/505; 358/408; 358/474; 715/700; 715/764
(58) Field of Classification Search .................. 358/1.13, 358/1.14, 1.15, 505, 408, 474; 715/700; 715/764
See application file for complete search history.

(56) References Cited

U.S. PATENT DOCUMENTS
| | | | |
|---|---|---|---|
| 5,742,279 A | 4/1998 | Yamamoto et al. | |
| 2002/0105674 A1* | 8/2002 | Nomura et al. | 358/1.15 |
| 2006/0126113 A1* | 6/2006 | Narazaki | 358/1.15 |
| 2007/0097411 A1 | 5/2007 | Kondo et al. | |
| 2008/0018949 A1* | 1/2008 | Fukuda | 358/450 |

FOREIGN PATENT DOCUMENTS
| | | |
|---|---|---|
| JP | 03-073656 | 3/1991 |
| JP | 08-107495 | 4/1996 |
| JP | 2000-232541 | 8/2000 |
| JP | 2001-320542 | 11/2001 |
| JP | 2005-44174 | 2/2005 |
| JP | 2005044174 A * | 2/2005 |
| JP | 2005-84403 | 3/2005 |
| JP | 2006-179977 | 7/2006 |
| JP | 2006-340279 | 12/2006 |
| JP | 2007-124523 | 5/2007 |

OTHER PUBLICATIONS

Japanese Office Action for corresponding application No. JP2007-312313 dated Jan. 5, 2010.

* cited by examiner

*Primary Examiner* — Jacky X Zheng
(74) *Attorney, Agent, or Firm* — Renner, Otto, Boisselle & Sklar, LLP

(57) ABSTRACT

An image processing apparatus including: an image processing section that processes an original image, and outputs the processed original image; an operating section that a user operates; a reading-and-displaying section disposed in the operating section, and has a function of reading control information as an image and has a function of displaying the read control information; an instruction input section disposed in the operating section, and receives an instruction regarding an original image; and a controller that controls operations of the image processing section, the reading-and-displaying section, and the instruction input section, wherein the controller instructs the reading-and-displaying section to read the control information, acquires the control information from a result read by the reading-and-displaying section, and instructs the image processing section to process the original image and to output the processed original image, based on the acquired control information and/or the instruction received by the instruction input section.

10 Claims, 11 Drawing Sheets

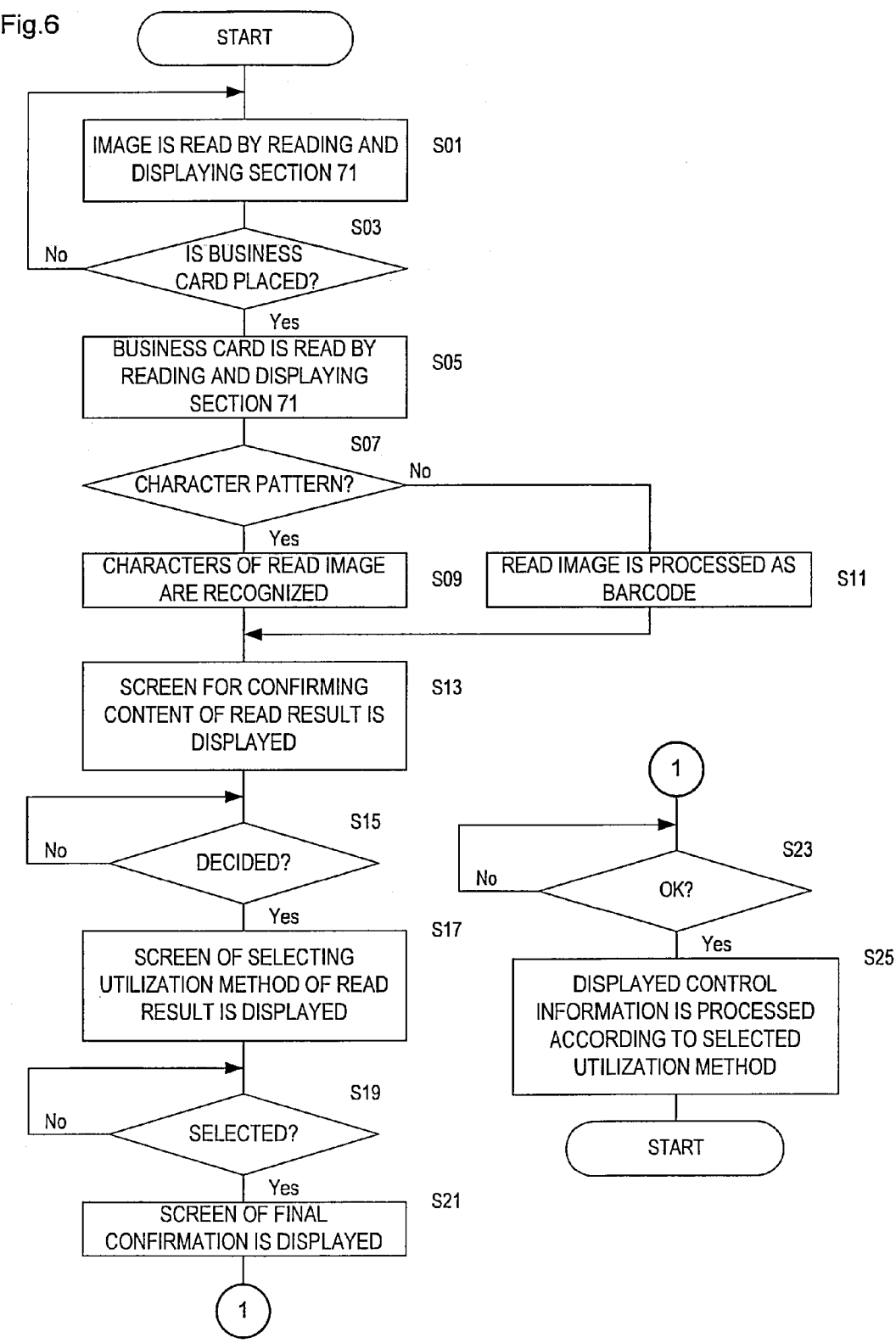

Fig.8

THE FOLLOWING CONTROL INFORMATION IS EXTRACTED.
AFTER SELECTING THE CONTROL INFORMAITON DESIRED TO BE UTILIZED,
PLEASE DEPRESS OK BUTTON (PLURAL SELECTIONS ARE POSSIBLE)

| SHxx |
| TARO YAMADA |
| YAMATO KORIYAMA-SHI NARA PREF. |
| TEL:0743-xx-xxxx |
| FAX:0743-xx-xxxx |
| Mail:tarou@shxx.co.jp |

[ OK ]  [ CANCEL ]

Fig.9

AFTER SELECTING DESIRED UTILIZATION METHOD, PLEASE DEPRESS OK BUTTON.

| REGISTERED INTO ADDRESS BOOK. |
| SET TO MAIL ADDRESS OF TRANSMISSION DESTINATION. |
| SET TO FACSIMILE NUMBER OF TRANSMISSION DESTINATION. |

[ OK ]  [ CANCEL ]

Fig.10

AFTER CONFIRMING CONTENT, PLEASE DEPRESS TRANSMIT BUTTON IF ACCEPTABLE.

FILE NAME: "" IS TRANSMITTED TO MAIL ADDRESS:
tarou@shxx.co.jp

[ TRANSMIT ]  [ CANCEL ]

IMAGE PROCESSING APPARATUS AND IMAGE PROCESSING METHOD BASED ON READING CONTROL INFORMATION AS AN IMAGE

CROSS-REFERENCE TO RELATED APPLICATION

This application is related to Japanese Patent Application No. 2007-312313 filed on Dec. 3, 2007, whose priority is claimed and the disclosure of which is incorporated by reference in its entirety.

BACKGROUND OF THE INVENTION

1. Field of the Invention

The present invention relates to an image processing apparatus and specifically relates to the image processing apparatus including a reading-and-displaying section having multiple functions such as a control information reading function of reading control information regarding image processing as an image and a display function of displaying the control information.

2. Description of Related Art

In recent years, a multi function peripheral developed from a copying machine has been spread. As the multi function peripheral, for example, in addition to a copying function, there is the one such as having multiple functions such as a facsimile function of transmitting/receiving image information via a telephone line or Internet, a network scanner function of reading an original image and transmitting data of the image read via a communication network to external equipment, and a printer function of printing the image data inputted from outside.

As a conventional art related to this invention, for example, a facsimile device having a function of reading the image of the facsimile number described in a business card, then extracting the facsimile number and information expressing a function of an opposite party facsimile device specified by this facsimile number from the read image, and setting the facsimile number of highest transmission efficiency as a transmission destination of an original, is publicly-known (for example, see Japanese Patent Laid Open No. 03-71677).

Also, as the conventional art related to this invention, a scanner device including a display device having multiple functions such as a display function and a scanner function of reading the image, and an instruction input section for designating a read area, so that only the image of the read area can be selectively read, is publicly-known (For example, see Japanese Patent Laid Open No. 2006-179977, "Input Display" capable of reading Photograph and Business card by a liquid crystal panel", (online Japanese article) Sep. 23, 2003, Windows (registered trademark) reported in CEFAN, (searched in Nov. 19, 2007), Internet <URL:http://www.wince.ne.jp/snap/ceSnapView.asp?PID=1453>, and "Liquid crystal functions as a scanner and further as a fingerprint sensor, SHARP develops a new liquid panel for mobile equipment (online Japanese article), Aug. 31, 2007, reported in ITmedia, (searched in Nov. 19, 2007) Internet <URL:http://plusd.itmedia.co.jp/mobile/articles/0708/31/news118.html>)

In the multi function peripheral added with a facsimile function and a network scanner function, there may be a case of inputting the facsimile number and a mail address of the opposite party that are to be the transmission destination. Of course, the facsimile number and the mail address are registered beforehand for the opposite party to which transmission is performed frequently, and by calling and selecting the registered facsimile number and the mail address as needed, the input of the facsimile number and the mail address can be omitted.

However, in a case of transmitting to a first-time opposite party, there is no choice but to manually input the facsimile number and the mail address of the opposite party. Also, in a case of registering the facsimile number and the mail address of the opposite party beforehand to save time in the future, there is no choice but to depend on a manual input of the name, the facsimile number, and the mail address of the opposite party.

Although, a work of registering the name, the facsimile number, and the mail address, etc, of the opposite party is performed by the manual input of a user at present, when there are many opposite parties to be registered, a considerable labor is required for an input work. Also, as a matter of course, an input error is possibly occurs, due to the manual input of the user.

Further, when the multifunction peripheral has a copying function and in a case of utilizing this copying function, the user has to arbitrarily set conditions in some cases over a lot of items such as a sheet size, duplex printing, magnification ratio, image density, erasure width of edges, number of copies, number of groups, etc, when an original is copied by the user.

Although the conditions thus set are sometimes repeatedly used at a site of an office work, it is troublesome for the user to manually input the aforementioned conditions every time the office work is performed.

Information regarding a required condition (setup content) for executing the processing of the image is called control information hereafter, such as a transmission destination of the image and a setup of functions of reading and printing the original image when the original image is read and printed.

In order to cope with the above-described problem, it is possible to consider a countermeasure such as registering set conditions by the user beforehand, and calling and utilizing the registered conditions as needed later.

However, at the site of the office work where one multi function peripheral is shared by many people, when each of them registers each own condition, the number of registrations becomes enormous, thus involving a problem that time and labor is required for calling a user's desired condition from the registered conditions.

SUMMARY OF THE INVENTION

In view of the above-described circumstance, the present invention is provided, and an object of the present invention is to provide the image processing apparatus and the image processing method, capable of realizing easy-to-use setup without troubling the user, by using a reading-and-displaying section having multiple functions such as an image reading function and a display function in setting the control information such as the facsimile number, the mail address, and the function setting.

The present invention provides an image processing apparatus including: an image processing section that processes an original image, and outputs the processed original image; an operating section that a user operates; a reading-and-displaying section that is disposed in the operating section, and has multiple functions such as a function of reading control information as an image and a function of displaying the read control information; an instruction input section that is disposed in the operating section, and receives an instruction regarding an original image; and a controller that controls operations of the image processing section, the reading-and-displaying section, and the instruction input section, wherein the controller instructs the reading-and-displaying section to read the control information, acquires the control information from a result read by the reading-and-displaying section, and instructs the image processing section to process the original image and to output the processed original image, based on the acquired control information and/or the instruction received by the instruction input section.

From a different viewpoint, the present invention provides an image processing method including the steps of: reading by use of an original image reading section an original image to be transmitted to an equipment outside an image processing apparatus; reading by use of a reading-and-displaying section identification information of the equipment to which the original image is transmitted, the reading-and-displaying section having multiple functions such as a function of reading control information as an image regarding the original image and a function of displaying the control information; acquiring the equipment from the identification information read by the reading-and-displaying section; and transmitting the original image to the equipment by use of a communicating section.

In addition, the present invention provides an image processing method including the steps of: reading by use of an original image reading section an original image to be transmitted to an equipment outside an image processing apparatus; reading by use of a reading-and-displaying section a setting of a printing process of the original image, the reading-and-displaying section having multiple functions such as a function of reading control information as an image regarding the original image and a function of displaying the control information; acquiring the print-setting read by the reading-and-displaying section; and printing the original image by use of a print section based on the acquired print-setting.

BRIEF DESCRIPTION OF THE DRAWINGS

FIG. 6 is a flowchart schematically showing a series of control flow performed by a controller at the time of "facsimile/image transmission" according to the present invention;

FIG. 8 is an explanatory view showing a display example of a reading-and-displaying section according to the present invention;

FIG. 9 is an explanatory view showing the display example of the reading-and-displaying section according to the present invention;

FIG. 10 is an explanatory view showing the display example of the reading-and-displaying section according to the present invention;

DESCRIPTION OF THE PREFERRED EMBODIMENTS

Figure 1:
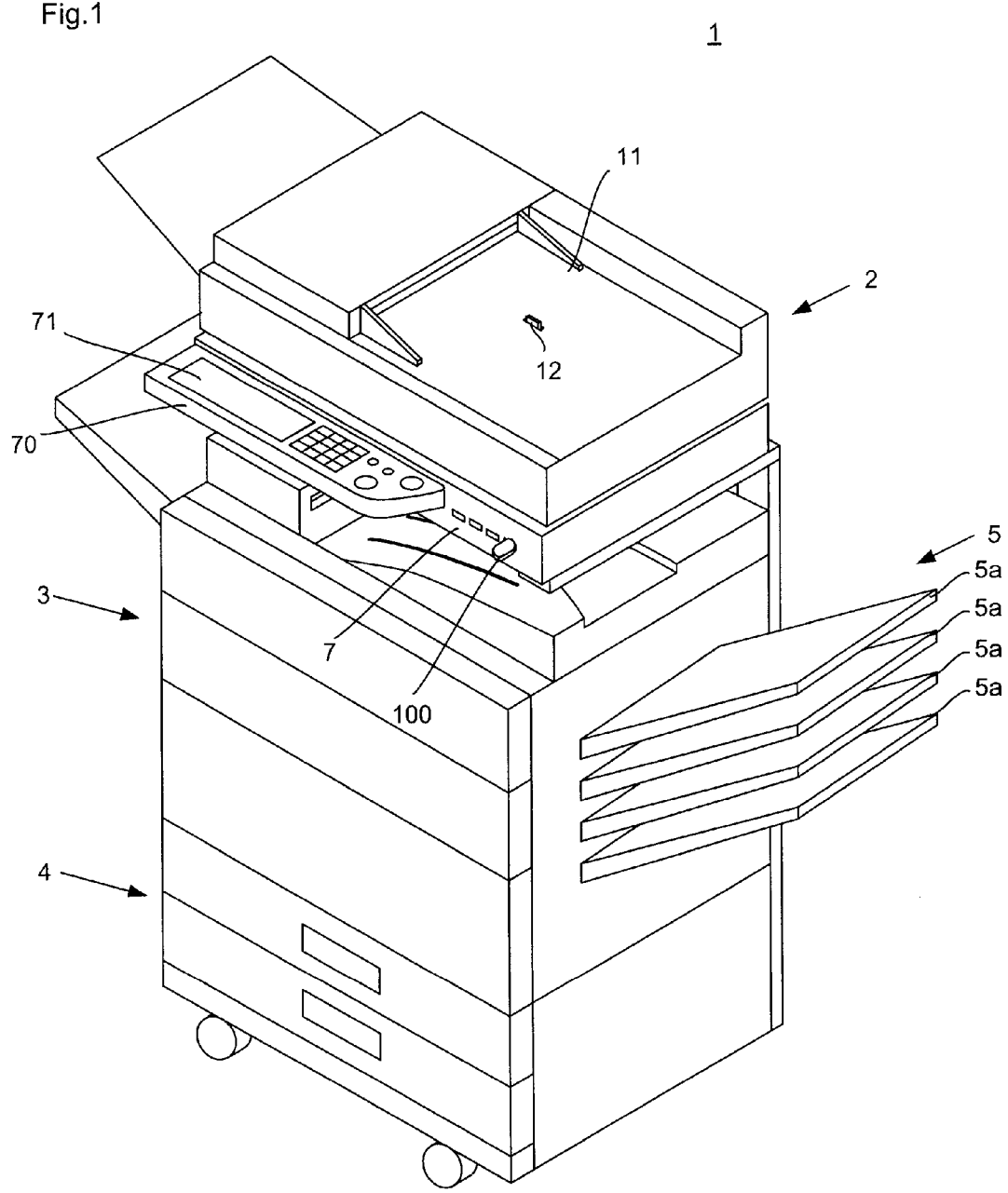
FIG. 1 is an external perspective view of an embodiment of a digital multi function peripheral according to the present invention.

According to the image processing apparatus of the present invention, under control of a controller, an image with content concerning control information described therein is read by the reading-and-displaying section of an operating section, to obtain the control information based on the read image, and by using the obtained control information to control an operation of an image processing section. This makes it possible to realize the easy-to-use setup of the control information without troubling a user. Accordingly, the user can obtain the control information that cannot be obtained conventionally if not depending on a manual input of the user, from the image read by the reading-and-displaying section.

Thus, usability of the user regarding an instruction of the control information is improved.

Here, when the image processing apparatus includes a scanner for reading an original, it is also possible to consider a case where a business card for designating a transmission destination can be read by the scanner for reading original. However, there are a number of scanners for reading original having automatic original feeders such as ADF, and a size of the original in which transmission destination information is described (such as a business card) is usually too small to be read by using the ADF. Therefore, in order to read the transmission destination information by a multi function peripheral including the scanner for reading original and the automatic original feeder, a work for opening/closing an original cover is required, thus impairing the usability of the user. In addition, when both of the transmission destination information and the transmitted original are read by the scanner for reading original, it is necessary for the user to perform operation of giving instruction for specifying a mode to grasp which kind of information is read, and perform operation of reading the business card and the original, in which the transmission destination information is described, according to a sequence previously defined at the apparatus side. Thus, an excellent operability is not realized for an inexperienced user.

According to the present invention, the operability of the user can be improved by disposing the reading-and-displaying section with the operating section having multiple functions such as the function of reading the image and the function of displaying the control information at the operating section capable of obtaining most excellent operability and highest visibility for the user. In addition, since the scanner for reading original and the scanner for reading the control information are individually provided, the original image and the control information can be simultaneously and parallely read. Accordingly, efficiency of image formation processing including the operation of the user can be improved. Here, since the reading-and-displaying section has multiple functions such as a display function and a scanner function, a set area of the operating section is not increased. Also, since information regarding operation and a reading result is displayed in the reading-and-displaying section, the operability for the user is not impaired.

The image processing apparatus according to the present invention is the apparatus for processing and outputting an input image. As specific aspects of the present invention, examples are given such as: a scanner that reads an image and outputs image data; a printer that acquires and print outs the image data; a copying machine having functions of the scanner and the printer, for copying a document image; and a facsimile device connected to a public line, for reading and transmitting the image and printing the received image data; and a multifunction peripheral with functions of an entire part or a part of the aforementioned scanner, printer, copying machine, and facsimile device combined.

In the image processing apparatus of the present invention, the image processing section functions to process inputted image and convert it to data that can be outputted, and an example of its specific aspect includes an integrated circuit for processing the image data; a storage element for storing the image data in a process of the image processing; a CPU for controlling the operation of these circuits; and a storage element (such as an ROM and a hard disc device) that stores a procedure of the processing executed by the CPU. Further, when there is the scanner for reading the image of the document, a scanner part is included. Also, when there is a print section for printing the image, a printer is included. In the embodiments as will be described later, image processing sections correspond to an original-feeding-and-reading section, a print section, a sheet feeding section, a finisher, and a transmitting/receiving section, and also correspond to a partial function of the controller.

The operating section functions to display information regarding the image processing apparatus and notify the user of this information, and receive an instruction from the user. This operating section corresponds to an operation panel in an embodiment as will be described later.

The reading-and-displaying section is a device having multiple functions such as a reading function of reading the image and a display function of displaying the image, and is disposed in the operation panel. For example, an element having an optical sensor provided adjacently to each pixel of a liquid crystal display, for example, devices as shown in "Input Display" capable of reading Photograph and Business card by a liquid crystal panel", (online) Sep. 23, 2003, Windows (registered trademark) reported in CEFAN, (searched in Nov. 19, 2007), Internet <URL:http://www.wince.ne.jp/snap/ceSnapView.asp?PID=1453>, and "Liquid crystal functions as a scanner and further as a fingerprint sensor, SHARP develops a new liquid panel for mobile equipment (online), Aug. 31, 2007, reported in ITmedia, (searched in Nov. 19, 2007) Internet <URL:http://plusd.itmedia.co.jp/mobile/articles/0708/31/news118.html> are given as a specific aspect of the reading-and-displaying section.

The operation of reading the original, in which the control information is described, by using the reading-and-displaying section disposed in the operation panel is given as the characteristic of the present invention.

An instruction input section is an input means that receives an instruction from the user, and key switches provided in the operation panel are given as examples of this instruction input section. In addition, the aforementioned reading-and-displaying section may also have a function as the instruction input section, by detecting touch on a surface of the aforementioned reading-and-displaying section by fingertip, using the reading function of the reading-and-displaying section. This reading function and the function as the instruction input section may be combined.

Particularly, in the image processing apparatus according to the present invention, the control information displayed in the aforementioned reading-and-displaying section is selected or inputted by the user through the instruction input section. Therefore, from the viewpoint of realizing an intuitive operation, it is preferable that the reading-and-displaying section functions as the instruction input section.

The control section is constituted of a storage element (ROM or a hard disc device) storing a control program executed by a microcomputer (MPU) or CPU, (MPU and CPU are collectively called as CPU hereafter in this specification), RAM that provides a work area in the CPU, an input/output circuit, etc, that performs input/output of a signal between a circuit and a sensor provided in each part of the image processing apparatus, and an actuator. The controller performs integrated control of the operations of the image processing section, the reading-and-displaying section, and the instruction input section.

The present invention is characterized in that under the control of the controller, the image is read by the reading-and-displaying section and the processing of obtaining the control information from this image is executed. In addition, the controller can display the procedure of the operation to be performed for reading the original in which the control information is described, the read image, and the control information, in the reading-and-displaying section. In the embodiment as will be described later, explanation is given, with the reading-and-displaying section regarded as the control section.

The business card, in which the transmission destination for transmitting the image information via a communicating section is described, can be given as an example of the one in which the control information is described. In addition, the following aspect is also possible. Namely, a dedicated mark sheet for designating function setting by a manufacturer of the image processing apparatus is provided to the user, so that this mark sheet is read by the user using the reading-and-displaying section. Further, it is also preferable that content of the function setting registered once is printed out by the image processing apparatus in a prescribed format. Such specific aspects are not limited, provided that the control information can be read by the reading-and-displaying section. The control information may be described as characters, symbol or numerals or combination of them, and also may be described as a mark of the mark sheet and barcode (first dimensional or second dimensional barcode). Also, such aspects are not limited, provided that the control information is set in a distinguishable form as the image.

Note that the transmission destination of the image as the control information includes, for example, information such as the title, name, phone number, facsimile number, and mail address, etc, of the transmission destination.

Meanwhile, for example, information such as sheet size, duplex printing, magnification ratio, image density, erasure width of edges, number of copies, number of groups, etc, can be given as examples of the information regarding the function setting.

Note that when the controller extracts prescribed control information from the read image information and displays it in the reading-and-displaying section, one or a plurality of control information may be displayed as the extracted and displayed control information.

Accordingly, the control information inputted or selected by the user is not limited to one and a plurality of control information may be inputted or selected.

Preferred embodiments of the present invention will be explained hereunder.

In the image processing apparatus according to the present invention may further include: an original image reading section that reads the original image, wherein the controller may instruct the original image reading section to read the original image, and simultaneously instruct the reading-and-displaying section to read the control information. With this structure, the original image and the control information can be simultaneously and parallely read, and therefore the efficiency of the image formation processing including the operation of the user can be improved.

In addition, the image processing apparatus according to the present invention may further include: a communicating section that transmits the original image to an equipment outside the image processing apparatus, the equipment being communicable by a wired or wireless connection, wherein the control information may include information for identifying the equipment to which the original image is to be transmitted; and the controller may instruct the reading-and-displaying section to read a business card indicating the equipment, and may acquire the identification information of the equipment from the business card. With this structure, the destination of the original image can be indicated, not depending on the manual input of the user, thus making it possible to save the labor of the user concerning the input work. In addition, input error due to the manual input can also be prevented.

Alternately, the reading-and-displaying section may read as an image a fingertip of an operator or a predetermined directive member that touches a surface of the reading-and-displaying section; the instruction input section may receive as one instruction the image of the fingertip or the predetermined directive member read by the reading-and-displaying section and a position on the reading-and-displaying section surface touched by the fingertip or the predetermined directive member; and the controller may instruct the reading-and-displaying section to display an image of the business card of the equipment and a sign which specifies in the image a mail address of the equipment, and determines the mail address in accordance with the position on the reading-and-displaying section surface touched by the fingertip or the predetermined directive member is also preferable. With this structure, the function as the instruction input section is realized by touching a surface of the reading-and-displaying section, and therefore the set area of the operating section is not increased. Further, a place displayed in the reading-and-displaying section is made to coincide with or brought close to a place for giving instructions, and therefore the user can easily set the control information and can easily understand a set result.

Note that it is also possible that a destination storage section storing destinations is further provided, and the controller displays in the reading-and-displaying section a selection whether or not the read destination should be stored in the destination storage section, and stores in the destination storage section the read destination when the storage into the destination storage section is selected.

Further, the controller may acquire a mail address of the equipment from its business card. With this structure, the mail address as the destination of the original image can be indicated, without depending on the manual input of the user, thus making it possible to save the labor of the user concerning the input work. In addition, the input error due to the manual input can be prevented.

Alternately, the controller may acquire a facsimile number of the equipment from its business card. With this structure, the facsimile number as the destination of the original image can be indicated, without depending on the manual input of the user, thus making it possible to save the labor of the user concerning the input work. Further, the input error due to manual input can also be prevented.

In addition, with this structure, the destination of the image information can be set by utilizing the business card obtained from the opposite party. Further, a destination list can also be prepared. In the business card, the information of the opposite party is described based on a specific format in many cases, and is suitable as the printed matter for extracting the control information.

In addition, the controller may instruct the reading-and-displaying section to read a one-dimensional or two-dimensional barcode indicating the control information, and may acquire the control information from it. With this structure, recognition accuracy can be improved by using the barcode of high reading accuracy. For example, in the business card, information such as company name, department, title, phone number, facsimile number, and mail address may be shown by a two dimensional barcode separately from a character string. In this case, the aforementioned each kind of information can also be collectively stored in the destination storage section.

Further, the image processing apparatus according to the present invention may further include: a print section that outputs an original image as a print, wherein the control information may include information for setting a printing process of the original image; and the controller may instruct the reading-and-displaying section to read a sheet on which the print-setting of the original image is described, and may acquire the print-setting from a result read by the reading-and-displaying section. With this structure, the function concerning print can be set without depending on the manual input of the user, thus making it possible to achieve the efficiency of the office work. Note that a print function may be set as a barcode. Here, the barcode is not limited to a normal barcode, and may be a two dimensional barcode. In a case of the two dimensional barcode, further more information can be shown, and function settings over various items can be reproduced.

In the image processing apparatus according to the present invention, when the user requests the storage of the set contents of the function concerning the image processing, in response thereto, it is also possible that, under the control of the controller, the content of the function setting is converted to the barcode and outputted from the print section.

With this structure, the set contents of the function concerning the image processing set by the user (such as the function of copy processing and the function of processing for reading original by the scanner) can be stored in the form of the barcode. Then, when copying is performed by applying the same set content, by reading the printed barcode as described above using the reading-and-displaying section, the set condition can be easily reproduced, thus making it possible to promote the efficiency of the office work.

Note that the barcode here is not limited to the normal barcode, and may be the two dimensional barcode.

Detailed explanation will be given hereunder for an image processing apparatus (digital multi function peripheral) according to the embodiments of the present invention, based on the drawings. Note that in the explanation given hereunder, examples are shown in all points, and these examples should not be interpreted as limiting the present invention.

(Overall Structure and Operation of the Digital Multi Function Peripheral)

Figure 2:
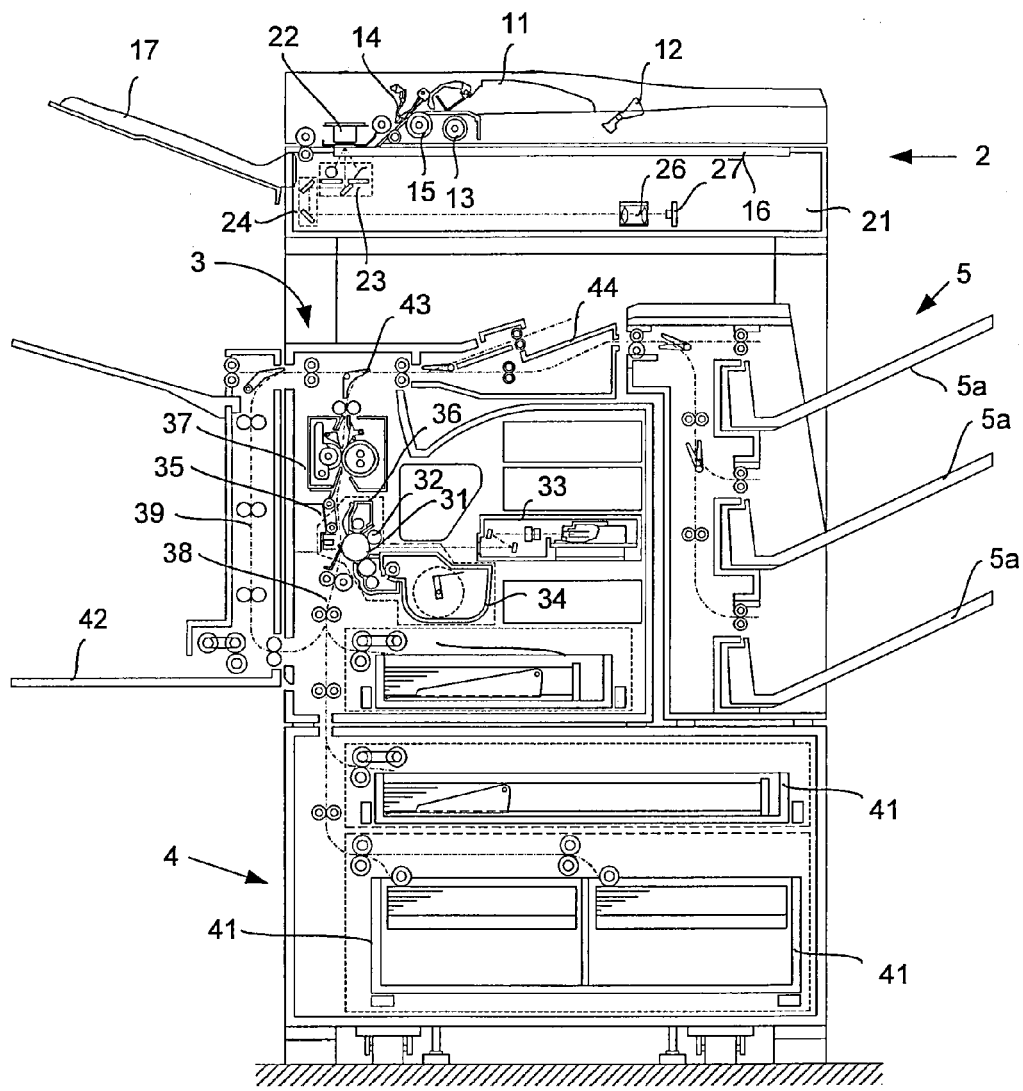
FIG. 2 is an explanatory view showing the whole structure of the digital multi function peripheral shown in FIG. 1.

FIG. 1 is an external perspective view of the digital multi function peripheral according to one aspect of the image processing apparatus of the present invention. In addition, FIG. 2 is an explanatory view showing a mechanical structure of the digital multi function peripheral (apparatus shown in FIG. 1) according to this embodiment. An operation panel, being an operating section of the present invention, is disposed at a place easily operated and easily recognized by a user, as shown in "70" of FIG. 1. In the operation panel 70, a reading-and-displaying section, being the reading-and-displaying section of this invention, and key switches, being an instruction input section of this invention, are arranged. In addition, the digital multi function peripheral includes an original feeding-and-reading section 2 and a print section 3, as image processing sections.

Further, detailed explanation is given. In this digital multi function peripheral 1, a copy mode (duplication mode) for reading an image of an original and printing it on a recording sheet; a facsimile mode for reading and transmitting the image of the original, then receiving the image of the original, and printing it on the recording sheet; and a printer mode for printing on a recording sheet the image received from an information terminal device via a network, can be selectively performed.

The digital multi function peripheral 1 is mainly constituted of the original feeding-and-reading section 2 corresponding to an original reading section, the print section 3, a sheet feeding section 4, a post-processing apparatus 5, and an USB interface 7.

Explanation for the operation of each part of the digital multi function peripheral 1 will be given in the last part of this embodiment. Therefore, see this part as needed.

(Extraction and Utilization of the Control Information)

Figure 3:
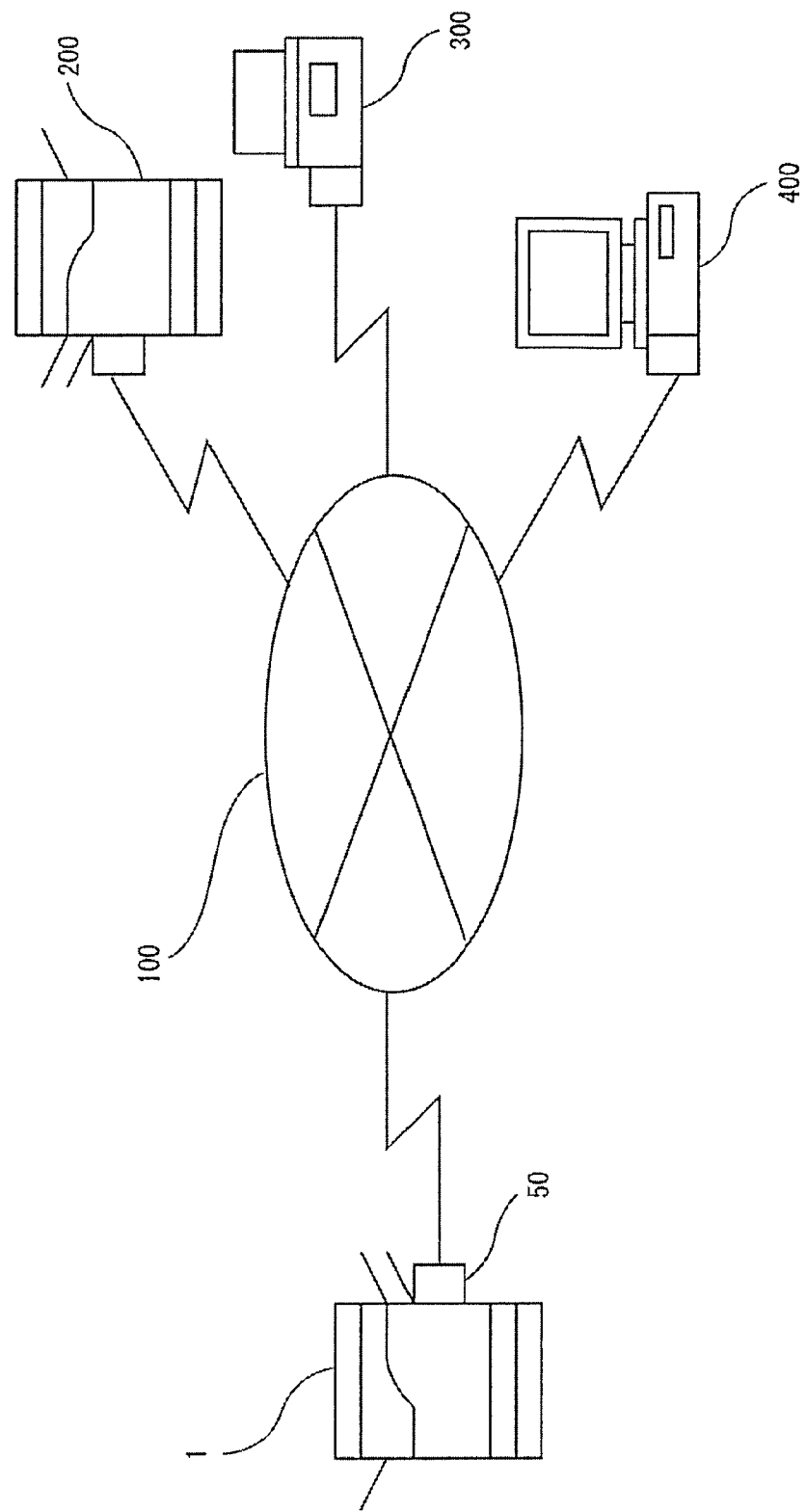
FIG. 3 is an explanatory view showing a digital multi function peripheral according to the present invention is connected to a terminal of an opposite party via a network.

In this item, the processing for acquiring a transmission destination of the image will be explained, as an example of the control information. As shown in FIG. 3, a digital multi function peripheral 1 according to this embodiment includes a transmitting/receiving section 50 (corresponding to a communicating section) as an interface of connecting an external network 100 including a telephone line and Internet, to the digital multi function peripheral 1, and this digital multi function peripheral 1 is connected to other multi function peripheral 200, a facsimile device 300, or a computer terminal 400 (they are called "terminals of the opposite party" hereafter), via the network 100.

When "FACSIMILE/IMAGE TRANSMISSION" is selected, the image data of the read original can be transmitted to the terminals of the opposite party. Of course, the digital multi function peripheral 1 has a function of receiving the image data transmitted from the terminals of the opposite party via the network 100 and also has a function of printing this image data on a recording sheet.

In addition, the digital multi function peripheral 1 includes a destination storage section 60 (see FIG. 5) for storing the information of a destination used at the time of the "FACSIMILE/IMAGE TRANSMISSION" as an "ADDRESS BOOK".

Figure 4:
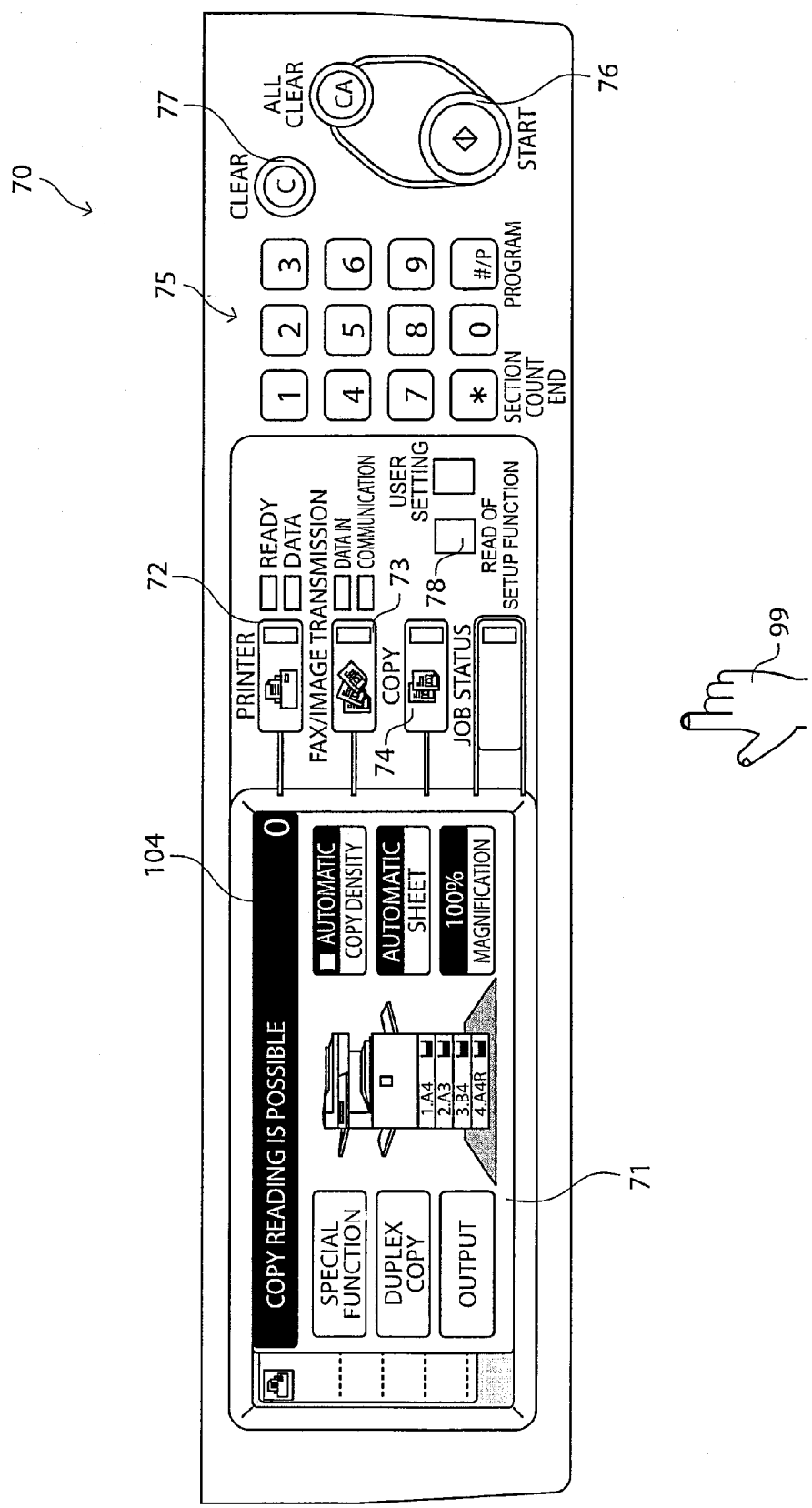
FIG. 4 is an explanatory view showing a structure of an operation panel of the digital multi function peripheral according to the present invention.

The operation panel 70 shown in FIG. 4 has multiple functions such as the reading function and the display function, and is constituted of a reading-and-displaying section 71 that functions as the instruction input section, and each kind of key switches (instruction input sections) such as function keys 72, 73, 74 for selecting the function of "PRINTER", "FAC-SIMILE/IMAGE TRANSMISSION", and "COPY", a key pad 75 used in an input of the number of copies, etc, a start key 76 for indicating execution of a set request, and a clear key 77 for releasing contents of the function setting (returning to a previously defined standard state). The reading-and-displaying section 71 functions as the instruction input section for receiving the input from the user, because touch of a fingertip 99 of the user on the surface of the reading-and-displaying section 71 is read to discriminate the information. Namely, although a touch panel as hardware is not provided, the touch of the user on the surface of the reading-and-displaying section 71 (area of a screen) can be detected and reacted, like a display apparatus with touch panel.

Figure 5:
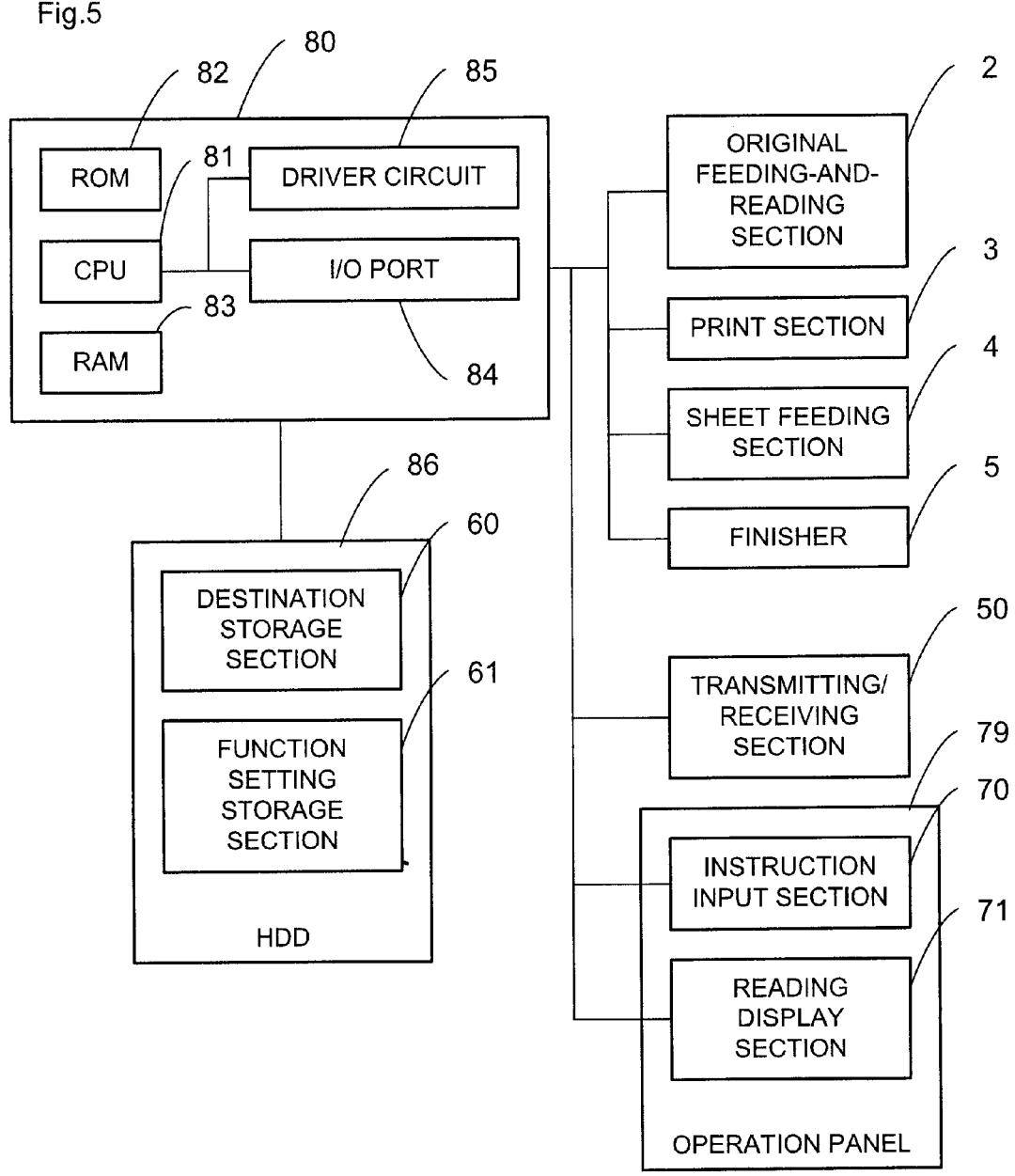
FIG. 5 is a block diagram showing an electrical structure of the digital multi function peripheral according to the present invention.

In addition, as shown in FIG. 5, the digital multi function peripheral 1 includes a motor; an actuator; a sensor; and a switch; etc, concerning its operation and control, in each part of the original feeding-and-reading section 2; the print section 3; the sheet feeding section 4, and the finisher 5. They are connected to a controller 80, and are controlled integrally by the controller 80. Further, data is communicated between the controller 80 and a hard disc device (HDD) 86. The destination storage section 60 and a function setting storage section 61 are assigned to a part of a storage area in the HDD 86. Further, the controller 80 can communicate with external equipment via the transmitting/receiving section 50. Still further, the controller 80 is connected to the reading-and-displaying section 71 and an instruction input section 79 disposed in the operation panel 70, and controls the operations of them.

The controller 80 is constituted of a CPU 81 that performs arithmetic processing; an ROM 82 that stores a control program executed by the CPU 81; an RAM 83 that provides a work area to the CPU; an I/O port 84 that performs input/output of a signal into/from each part of the image processing apparatus; and a driver circuit 85 that drives each kind of driving section under the control of the CPU 81.

Explanation will be given hereunder, for a series of processing performed by the controller 80 at the time of "FACSIMILE/IMAGE TRANSMISSION".

The controller 80 performs control, so that the display of the reading-and-displaying section 71 is switched to a screen of "FACSIMILE/IMAGE TRANSMISSION", in response to a depression of the function key 73, when the function key 73 of the "FACSIMILE/IMAGE TRANSMISSION" is depressed in the operation panel shown in FIG. 4.

In addition, the controller 80 recognizes that the original is set in an original set tray 11 of the original feeding-and-reading section 2 by a signal from an original detection sensor 12. The original may be set before the function key 73 of the "FACSIMLE/IMAGE TRANSMISSION" is depressed, or may be set after reading processing of the business card as will be described later. In the present invention, read of the original image is performed in the original feeding-and-reading section 2, and meanwhile, read of the business card is performed in the reading-and-displaying section 71. Therefore, before/after of setting the original and reading the business card are not limited, and can be performed in a procedure easy to be operated by the user.

Figure 7A:
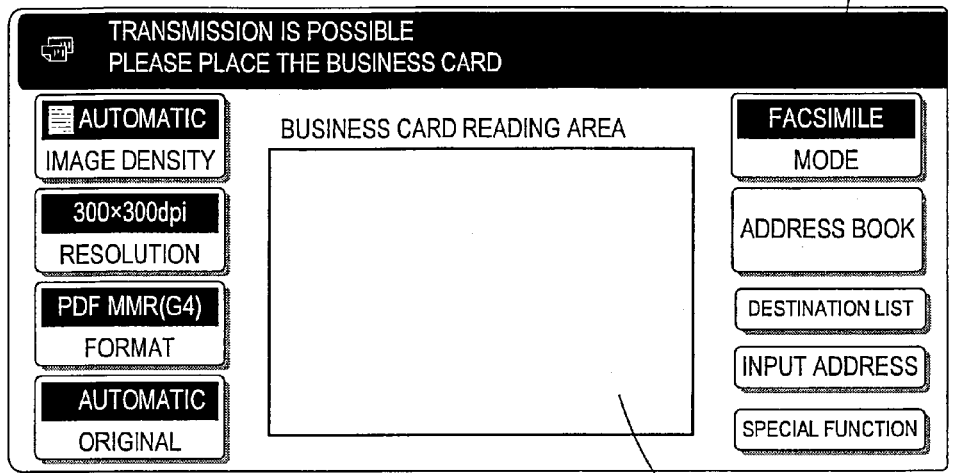
FIGS. 7A to 7C are an explanatory view showing a screen for programming a facsimile transmission function, the screen being capable of reading a business card according to the present invention.
Figure 7B:
Figure 7C:
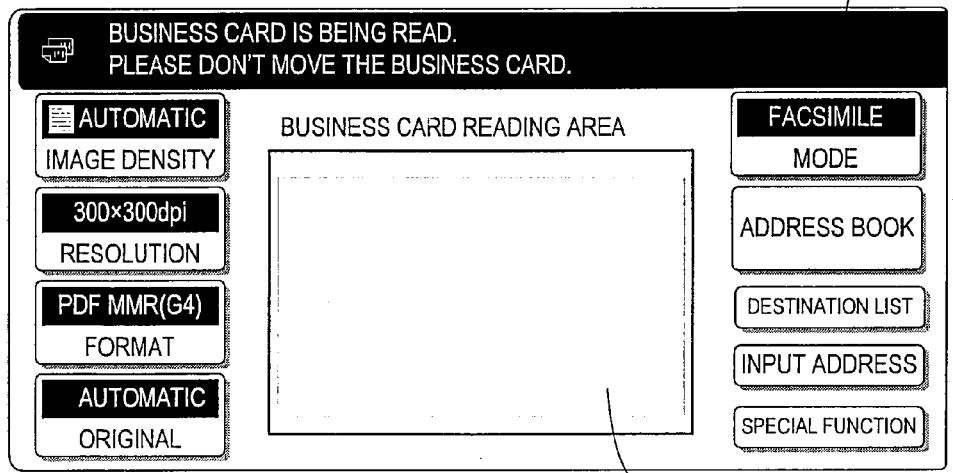

FIG. 6 is a flowchart schematically showing a series of processing procedure performed by the controller 80 at the time of the "FACSIMLE/IMAGE TRANSMISSION". FIGS. 7A to 7C are explanatory view showing the screen of a "FACSIMLE/IMAGE TRANSMISSION" mode capable of reading the business card.

FIG. 7A is a view of a screen displayed after the function key 73 of the "FACSIMLE/IMAGE TRANSMISSION" is depressed. As shown in FIG. 7A, as conditions for reading the original, buttons for setting "IMAGE DENSITY", "RESOLUTION", "FORMAT", "ORIGINAL" (size of the original), "MODE SWITCHING" (selection between a facsimile transmission mode and a network scanner mode) and "SPECIAL FUNCTION" (each kind of edit functions such as edge deletion and page division, etc.) are displayed. When the user touches positions of these buttons, a screen of a set menu according to the function assigned to each button is displayed. In addition, an area for message display (message area 71M) is arranged in an upper part of the screen, and a message is displayed, such as "transmission is possible. When the destination is read, please place the business card within an edge line".

Further, the buttons of the "ADDRESS BOOK" (for selection of registered transmission destination), "DESTINATION LIST" (for confirmation display of the selected destination), "ADDRESS INPUT" (mail address and telephone number, etc, for manual input) and the edge line showing a business card reading area 92 are displayed within the screen. In this state, the controller 80 performs control so that the business card reading area 92 is repeatedly read by the reading-and-displaying section 71 (step S01), then the characteristics of the read image (such as characteristics of a contour shape of the business card and a layout of characters) are recognized by a publicly-known image recognition technique, and placement of the business card can be detected (step S03).

Here, when the business card 90 (see FIG. 7B) is placed face-down within the edge line of the business card reading area 92, the controller 80 recognizes that the business card 90 is placed in the business card reading area 92, from a reading result of the reading-and-displaying section 71. Based on this recognition result, the controller 80 displays the message such as "the business card is being read. Please don't move the business card" in the message area 71M, and makes the reading-and-displaying section 71 read the business card again (step S05). This makes it possible to perform recognition processing with high accuracy.

When the image of the business card 90 is read, from the characteristic of the read image, the controller 80 determines whether character recognition processing should be performed, or barcode reading processing should be performed (step S07). Since the characters are described in the business card 90 of this embodiment, the controller 80 so determines that the character recognition processing should be performed (Yes in step S07), and based on this determination, performs character recognition processing (step S09). Meanwhile, when it is so determined that no characters are recognized, the reading processing as the barcode is performed (step S11). Such a discrimination of the characteristic of the image, a character recognition technique, or a barcode reading technique can be realized by using a publicly-known technique. Therefore, further more detailed explanation is omitted.

Under the control of the controller 80, the user confirms the result of character recognition, and a screen for allowing the user to select a part utilized as the destination is displayed in the reading-and displaying section 71 (step S13). FIG. 8 is an explanatory view showing an example of this screen. As shown in FIG. 8, the controller 81 displays the message in a message area, such as "THE FOLLOWING CONTROL INFORMATION IS EXTRACTED. AFTER SELECTING THE CONTROL INFORMATION DESIRED TO BE UTILIZED, PLEASE DEPRESS OK BUTTON (PLURAL SELECTIONS ARE POSSIBLE)", and also displays a recognized character string in the screen (step S4).

In response to the displayed message, for example, when the user selects a part in which the character string showing the mail address of the opposite party is displayed and performs operation of depressing an "OK" button, the controller 80 recognizes the aforementioned operations (Yes in step S15). Then, as shown in FIG. 9, candidates of the utilization methods are displayed in the reading-and-displaying section 71, so that the user can select a utilization method of the recognition result (step S17). The message such as "AFTER SELECTING A DESIRED UTILIZATION METHOD, PLEASE DEPRESS OK BUTTON" is displayed in the message area 71M.

In a screen of FIG. 9, for example, when the user selects "SET TO THE MAIL ADDRESS OF THE TRANSMISSION DESTINATION", and touches the "OK" button, the controller 80 recognizes the aforementioned operations (step S19). Then, the mail address of the transmission destination is displayed in the screen, for final confirmation (step S23). FIG. 10 is an explanatory view showing a state in which the transmission destination is displayed in the screen. In a screen of FIG. 10, the controller 80 displays the message such as "file: xxxxx is transmitted to mail address: tarou@sharp.co.jp", as a confirmation content of the transmission destination. In addition, the message such as "AFTER CONFIRMING THE CONTENT, PLEASE DEPRESS TRANSMIT IF ACCEPTABLE" is shown in the message area.

Note that at this time, the controller 80 treats remained character string with the character string such as "E-mail:" or "Mail:" deleted from the previously recognized character string, as the mail address.

When the user confirms the displayed content and depresses "TRANSMIT", the controller 80 responses thereto, and processes the control information (mail address in this explanation) displayed in the screen, according to the selected utilization method (set to the mail address of the transmission destination in this explanation) (step S25). Namely, the mail address is set as a transmission destination mail address of the image read by the original feeding-and-reading section 2.

When the start key 76 is depressed, with the original set in the original feeding-and-reading section 2, the controller 80 recognizes depression of the start key 76, and makes the original feeding-and-reading section 2 read the original, and processes the read original image so as to be in a transmittable state.

Figure 11:
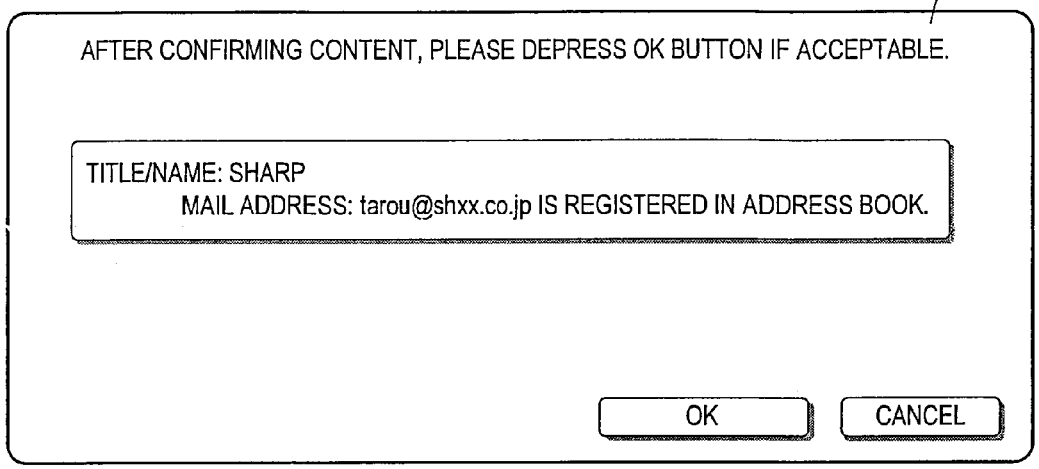
FIG. 11 is an explanatory view showing the display example of the reading-and-displaying section according to the present invention.
Figure 12:
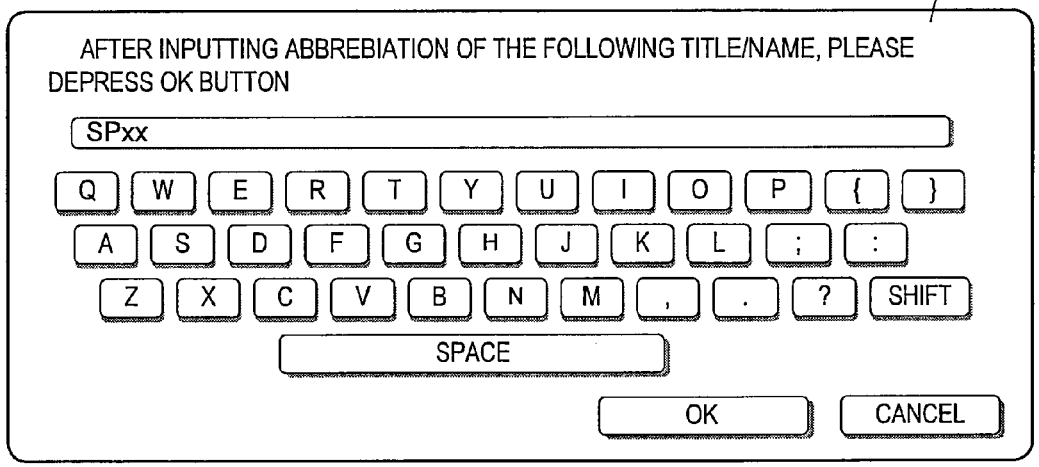
FIG. 12 is an explanatory view showing the display example of the reading-and-displaying section according to the present invention.

In addition, as a different example, in the screen shown in FIG. 8, when the user selects the character string showing the name of an assignment destination of the opposite party and the mail address of the opposite party (step S4), and selects "registered in the address book" in the screen shown in FIG. 9 (step S7), the controller 80 displays a confirmation display in the reading-and-displaying section 71, such as "title/name: SHARP; mail address: tarou@sharp.co.jp is registered in the address book" as shown in FIG. 11 (step S8), and when the user confirms the display content and depresses "REGISTER" button in this screen, this scan is recognized and a abbreviation input screen of "TITLE/NAME" as shown in FIG. 12 is displayed, and the processing is moved to input processing of reading. When input is completed, under the control of the controller 80, the mail address and its reading are registered (stored) in the address book (destination storage section 60) (step S9).

Note that at this time also, the controller 80 determines the control information including the character string such as "E-mail:" or "Mail:" as the mail address, and the remaining character string with the character string such as "E-mail:" or "Mile:" deleted from the previously recognized character string is treated as the mail address and is registered in the address book.

Meanwhile, the control information not including the character string such as "E-mail:" or "Mail:" is determined and treated to be the title or name of the opposite party in principle.

As described above, explanation has been given, with the mail address taken as an example of the destination. However, similar explanation may be applied when the destination is the facsimile number.

Figure 13:
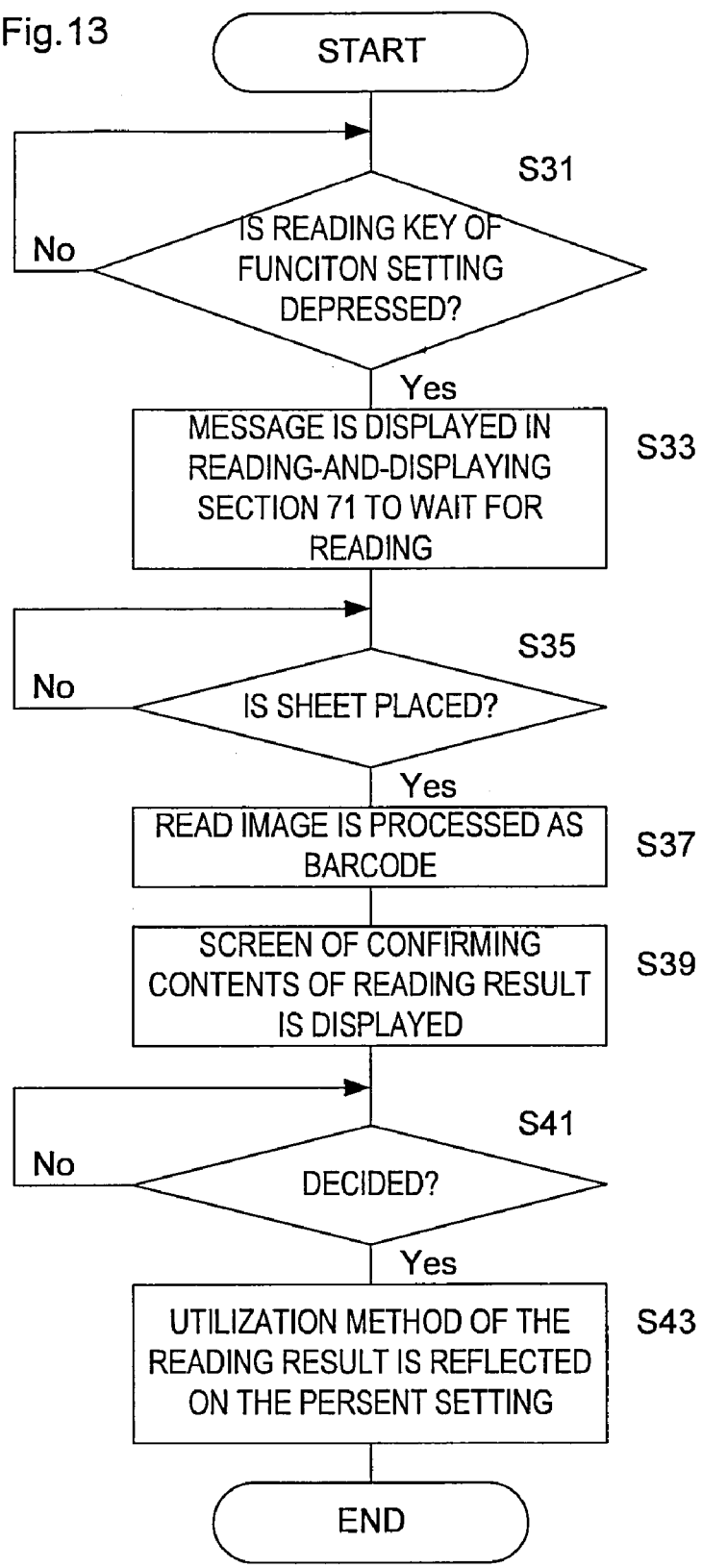
FIG. 13 is a flowchart schematically showing a series of control flow performed by the controller at the time of a copy mode according to the present invention.
Figure 14:
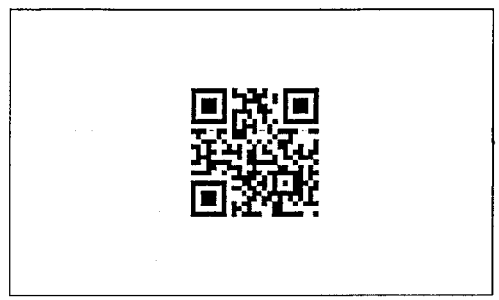
FIG. 14 is an explanatory view showing a two dimensional barcode as a printed matter according to the present invention.

Next, explanation will be given for a series of control flow performed by the controller 80, when the function setting concerning copy operation is read at the time of a copy mode, based on FIG. 13. In this embodiment, content of the function setting is assumed to be given as a two dimensional barcode. FIG. 14 is an explanatory view showing an example of the two dimensional barcode to be read. In this embodiment, the digital multi function peripheral 1 has a function of outputting content of the registered function setting as the two dimensional barcode. Note that based on a certain character string and data, a technique of generating the two dimensional barcode corresponding to these character string and data is publicly-known. The digital multi function peripheral 1 according to this embodiment generates and prints a two dimensional barcode 91 concerning the control information by using a publicly-known technique. FIG. 13 is a flowchart schematically showing a series of the control flow performed by the controller 80 when the mode is set in the copy mode.

When the function key 74 of "COPY" is depressed in the operation panel shown in FIG. 4, under the control of the controller 80, the display of the reading-and-displaying section 71 is switched to a screen for copy. The screen shown in FIG. 4 is an example of the screen for copy. The message such as "copy reading is possible" is displayed in the message area.

In addition, the controller 80 recognizes that the original is set in an original set tray 11 of the original feeding-and-reading section 2 by the signal from the original detection sensor 12. The original may be set before the function key 74 of "COPY" is depressed, or may be set after barcode reading processing as will be described later is performed. According to the present invention, read of the original image is performed in the original feeding-and-reading section 2, and meanwhile, read of the barcode is performed in the reading-and-displaying section 71. Therefore, before/after of setting the original and read of the barcode is not limited, and the user can perform operation in a procedure easy to be operated.

In the copy mode, when the key switch 78 of "read of function setting" shown in FIG. 4 is depressed, the controller 80 recognizes this message (step S31), and displays the message not shown such as "function setting is read. Please place a sheet in an edge line of the reading area" to wait for the reading. In addition, the controller 80 performs control so as to display the edge line of the reading area in the screen (step S33). The controller 80 determines from the read image, whether or not the sheet, in which the content of the function setting is described, is placed in the reading-and-displaying section 71. In this embodiment, determination on whether or not the sheet is placed is performed by whether or not the image that can be recognized as the image of the two dimensional barcode is read.

When the user places the sheet, on which the two dimensional barcode 91 is printed, on the reading-and-displaying section 71, the controller 80 recognizes a characteristic part of this image, determines that the sheet is placed (step S35), and performs barcode reading processing (step S37). At this time, the controller 80 displays the message in the message area, such as "Image is being read. Please don't move the sheet".

Figure 15:
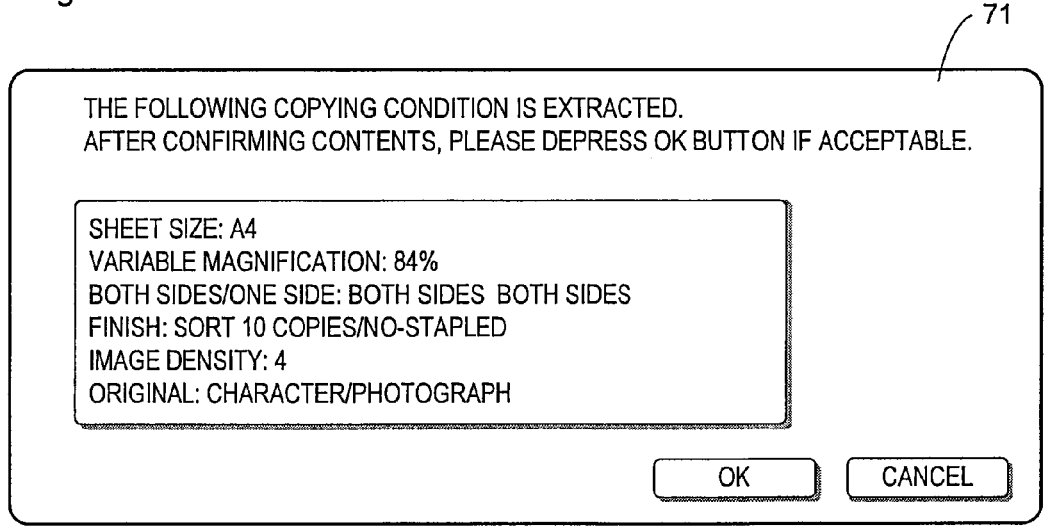
FIG. 15 is an explanatory view showing the display example of the reading-and-displaying section according to the present invention.

When the barcode reading processing is ended, the controller 80 recognizes the content of the function setting embedded in the barcode based on the read image, and displays the recognized content in the reading-and-displaying section 71. Then, the user confirms whether or not the displayed function setting should be applied to image formation (duplication). Therefore, the message such as "the following copying condition is extracted. After confirming the content, please depress "OK" button if acceptable" is displayed in the message area (step S39). FIG. 15 is an explanatory view showing a screen for requesting confirmation of the recognized function setting. In the screen of FIG. 15, when the user touches the "OK" button (step S41), the controller 80 recognizes this message, and performs control to reflect this copying condition on the present setting (step S43). Accordingly, thereafter, when the user depresses the start key 76, with the original set in the original feeding-and-reading section 2, copy processing is performed under a reflected copying condition.

In the copy mode also, the content of the function setting may be stored. In such a case, the digital multi function peripheral 1 further includes a function setting storage section not shown in FIG. 5. The controller 80 can display a dedicated menu screen for storing the present function setting. When the user performs prescribed operation for storing the function setting set at present by using the screen for storing the function setting, in response thereto, the controller 80 stores the content of the present function setting into the aforementioned function setting storage section. The stored content of the function setting can be called later and the called content of the function setting can also be converted to the barcode to print this barcode. Such a function can be realized by combining publicly-known techniques.

(Explanation for the Operation of the Digital Multi Function Peripheral)

The operation of the digital multi function peripheral 1 shown in FIG. 1 and FIG. 2 will be explained, with the copy mode taken as an example.

First, when the original is set in the original set tray 11 of the original feeding-and-reading section 2, the original detection sensor 12 detects the set of the original.

Thereafter, the user operates the operation panel 70 of the original feeding-and-reading section 2, then inputs a size and a variable magnification ratio of the recording sheet as needed, and gives an instruction of starting copy.

In response to these operations, in the original feeding-and-reading section 2, the original sheets on the original set tray 11 are sequentially fed by a pickup roller 13, then fed onto a platen glass 16 one by one passing between a separating plate 14 and a feeding roller 15, and then fed on the platen glass 16 in a prescribed direction (sub-scanning direction), and is ejected to an original exit tray 17.

At this time, an image on a front side of the original is read by a first reading section 21. Under the control of the controller 80 not shown in FIG. 2 (see FIG. 5), a first scanning unit 23 and a second scanning unit 24 of the first reading section 21 are respectively moved to a home position, and at a timing when the original is fed onto the platen glass 16, an exposure lamp of the first scanning unit 23 is made to emit light, to irradiate a surface of the original through the platen glass 16.

Reflected light reflected from the surface of the original is guided to an image forming lens 26, with its optical path changed by each reflection mirror of the first and second scanning units 23 and 24. The reflected light is then condensed and the image thereof is formed on a CCD (Charged Coupled Device) 27.

Also, an image on a rear side of the original is read by a second reading section 22. The second reading section 22 is disposed in an upper side of the platen glass 16.

The second reading section 22 is constituted of an exposure lamp (LED (such as a Light Emitting Diode) array and a fluorescent lamp) for irradiating the rear side of the original, a Selfoc lens array for condensing the reflected light of the original per each pixel, and a contact image sensor (CIS) for photoelectrically converting the reflected light of the original received through the Selfoc lens array and outputting an analogue image signal.

It is also possible that an upper casing of the original feeding-and-reading section 2 is opened, then the original is placed on the platen glass 16, to read the image of the original (original fixing system). In this case, when the instruction of starting copy is given, the first scanning unit 23 of the first reading section 21 is moved in a sub-scanning direction from the home position at speed V, while irradiating the original, and simultaneously the second scanning unit 24 is also moved in the sub-scanning direction from the home position at speed V/2.

Thus, the image of the reflected light from the original is formed on the CCD 27 through the image forming lens 26 while an optical path length is always kept constant.

Thus, when the images of one side or both sides of the original are read, the read image data is inputted into the controller 80 constituted of a microcomputer, etc.

The image data inputted into the controller 80 is subjected to each kind of image processing, and is outputted to the print section 3.

The print section 3 is a section for printing an image corresponding to the image data on the recording sheet, and is mainly constituted of a photoconductor drum 31, a charging device 32, a laser scanning unit 33, a developing device 34, a transferring device 35, a cleaner 36, a discharging device (not shown), and a fuser 37, and so forth.

Also, the print section 3 includes a main transport path 38 and a reverse transport path 39, and a recording sheet fed from a sheet feeding section 4 is fed along the main transport path 38.

The sheet feeding section 4 delivers the recording sheet stored in a sheet feeding cassette 41 or the recording sheet placed on a manual feeding tray 42 one by one, and feeds this recording sheet to the main transport path 38 of the print section 3.

The recording sheet passes between the photoconductor drum 31 and the transferring device 35, while being fed along the main transport path 38 of the print section 3, and when the recording sheet passes through the fuser 37, print is performed on this recording sheet.

The photoconductor drum 31 is rotated in one direction, and its surface is cleaned by the cleaner 36 and discharged by the discharging device, and thereafter is uniformly charged by the charging device 32.

The laser scanning unit 33 demodulates laser beams based on the image data read by the original feeding-and-reading section 2 and subjected to image processing by the controller 80, and repeatedly scans a surface of the photoconductor drum 31 by this laser beams in a main-scanning direction, thereby forming an electrostatic latent image on the surface of the photoconductor drum 31.

The developing device 34 supplies toner to the surface of the photoconductor drum 31 to develop the electrostatic latent image thereon, and forms a toner image on the surface of the photoconductor drum 31.

The transferring device 35 transfers the toner image formed on the surface of the photoconductor drum 31, onto the recording sheet passing between the transferring device 35 and the photoconductor drum 31.

The fuser 37 heats and pressurizes the recording sheet, to thermally melt and fix an unfixed toner image on the recording sheet.

A blanch claw 43 is disposed at a connection place of the main transport path 38 and the reverse transport path 39. When only one side of the recording sheet is printed, the blanch claw 43 is positioned at a position shown in FIG. 2, and by this blanch claw 43, the recording sheet passing through the fuser 37 is guided to a sheet exit tray 44 or a finisher 5.

Meanwhile, when both sides of the recording sheet are printed, the blanch claw 43 is turned so as to guide the recording sheet with one side printed to the reverse transport path 39. The recording sheet guided to the reverse transport path 39 is turned over by a switchback unit in the middle of the reverse transport path 39, and is fed to the main transport path 38 again.

A rear side of the recording sheet fed to the main transport path 38 is printed, through the process of transfer and fixing step, and the recording sheet, with the rear side printed, is guided toward the sheet exit tray 44 or the finisher 5, by the blanch claw that is turned again to return to an initial position.

The recording sheet thus printed is guided to the sheet exit tray 44 or the finisher 5 to be ejected to the sheet exit tray 44, or is ejected to any one of a plurality of sheet exit trays 5a provided in the finisher 5.

In the finisher 5, a plurality of recording sheets are sorted to each sheet exit tray 5a to be ejected, then punching processing is applied to each recording sheet, and staple processing is applied to each recording sheet.

For example, when printed matters of plural number of copies are prepared, the recording sheets are sorted to each sheet exit tray 5a to be ejected so that a printed matter of one copy is assigned to each sheet exit tray 5a, and punching processing and staple processing are applied to each sheet exit tray 5a, to prepare the printed matter.

Various modified examples are possible for this invention, in addition to the above-described embodiments. These modified examples should not be interpreted as not belonging to the scope of the claims of this invention. All modifications in the meaning equivalent to the scope of the claims, and within the scope of the claims should be included in the present invention.

What is claimed is:

1. An image processing apparatus comprising:
an image processing section that processes an original image, and outputs the processed original image;
an operating section that a user operates;
a reading-and-displaying section that is disposed in the operating section, and has multiple functions such as a function of reading control information as an image and a function of displaying the read control information;
an instruction input section that is disposed in the operating section, and receives an instruction regarding an original image; and
a controller that controls operations of the image processing section, the reading-and-displaying section, and the instruction input section,
wherein the controller instructs the reading-and-displaying section to read the control information, acquires the control information from a result read by the reading-and-displaying section, and instructs the image processing section to process the original image and to output the processed original image, based on the acquired control information, and further comprising:

an original image reading section that reads the original image, wherein the controller instructs the original image reading section to read the original image, and simultaneously instructs the reading-and-displaying section to read the control information in parallel with the reading of the original image.

2. The image processing apparatus according to claim 1, further comprising:

a communicating section that transmits the original image to an equipment outside the image processing apparatus, the equipment being communicable by a wired or wireless connection, wherein the control information includes information for identifying the equipment to which the original image is to be transmitted; and the controller instructs the reading-and-displaying section to read a business card indicating the equipment, and acquires the identification information of the equipment from the business card.

3. The image processing apparatus according to claim 2, wherein the reading-and-displaying section reads as an image a fingertip of an operator or a predetermined directive member that touches a surface of the reading-and-displaying section;

the instruction input section receives as one instruction the image of the fingertip or the predetermined directive member read by the reading-and-displaying section and a position on the reading-and-displaying section surface touched by the fingertip or the predetermined directive member; and the controller instructs the reading-and-displaying section to display an image of the business card of the equipment and a sign which specifies in the image a mail address of the equipment, and determines the mail address in accordance with the position on the reading-and-displaying section surface touched by the fingertip or the predetermined directive member.

4. The image processing apparatus according to claim 2, wherein the controller acquires a mail address of the equipment from its business card.

5. The image processing apparatus according to claim 2, wherein the controller acquires a facsimile number of the equipment from its business card.

6. The image processing apparatus according to claim 1, wherein the controller instructs the reading-and-displaying section to read a one-dimensional or two-dimensional barcode indicating the control information, and acquires the control information from it.

7. The image processing apparatus according to claim 6, further comprising:

a print section that outputs an original image as a print, wherein the control information includes information for setting a printing process of the original image; and the controller instructs the reading-and-displaying section to read a sheet on which the print-setting of the original image is described, and acquires the print-setting from a result read by the reading-and-displaying section.

8. The image processing apparatus according to claim 1, wherein the original image is processed based on the acquired control information and the instruction received by the instruction input section.

9. An image processing method comprising the steps of:

reading by use of an original image reading section an original image to be transmitted to an equipment outside an image processing apparatus;

reading, simultaneously as and in parallel with reading the original image, by use of a reading-and-displaying section identification information of the equipment to which the original image is transmitted, the reading-and-displaying section having multiple functions such as a function of reading control information as an image regarding the original image and a function of displaying the control information;

acquiring the equipment from the identification information read by the reading-and-displaying section; and transmitting the original image to the equipment by use of a communicating section.

10. An image processing method comprising the steps of:

reading by use of an original image reading section an original image to be transmitted to an equipment outside an image processing apparatus;

reading, simultaneously as and in parallel with reading the original image, by use of a reading-and-displaying section a setting of a printing process of the original image, the reading-and-displaying section having multiple functions such as a function of reading control information as an image regarding the original image and a function of displaying the control information;

acquiring the print-setting read by the reading-and-displaying section; and printing the original image by use of a print section based on the acquired print-setting.

* * * * *